Figure 4:
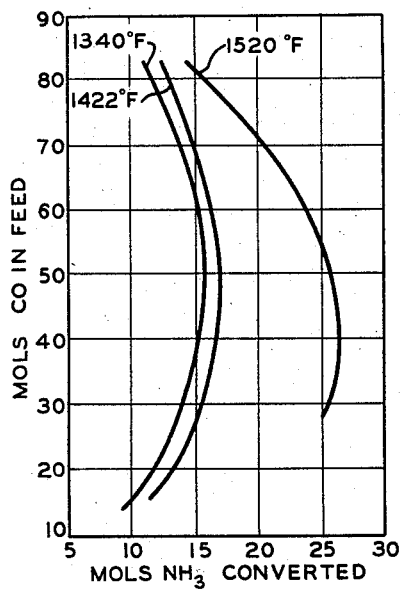

Dec. 15, 1959     K. H. HACHMUTH ET AL     2,917,363
MANUFACTURE OF CALCIUM CYANAMID
Filed Dec. 31, 1956     3 Sheets-Sheet 1
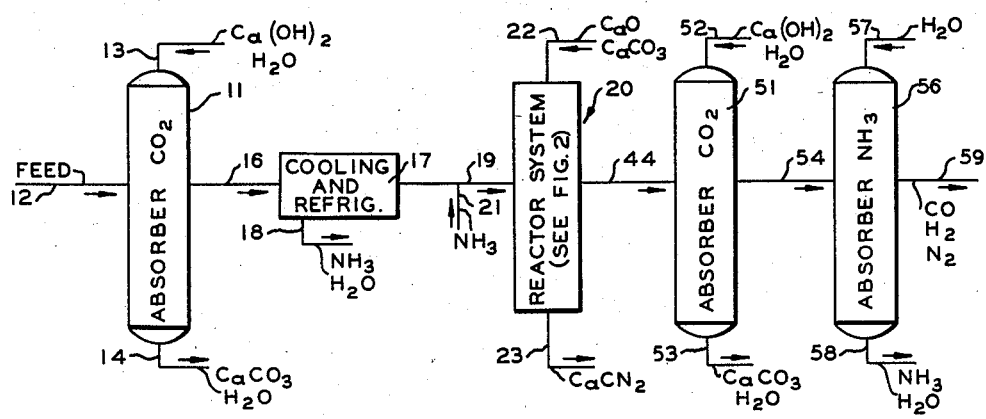
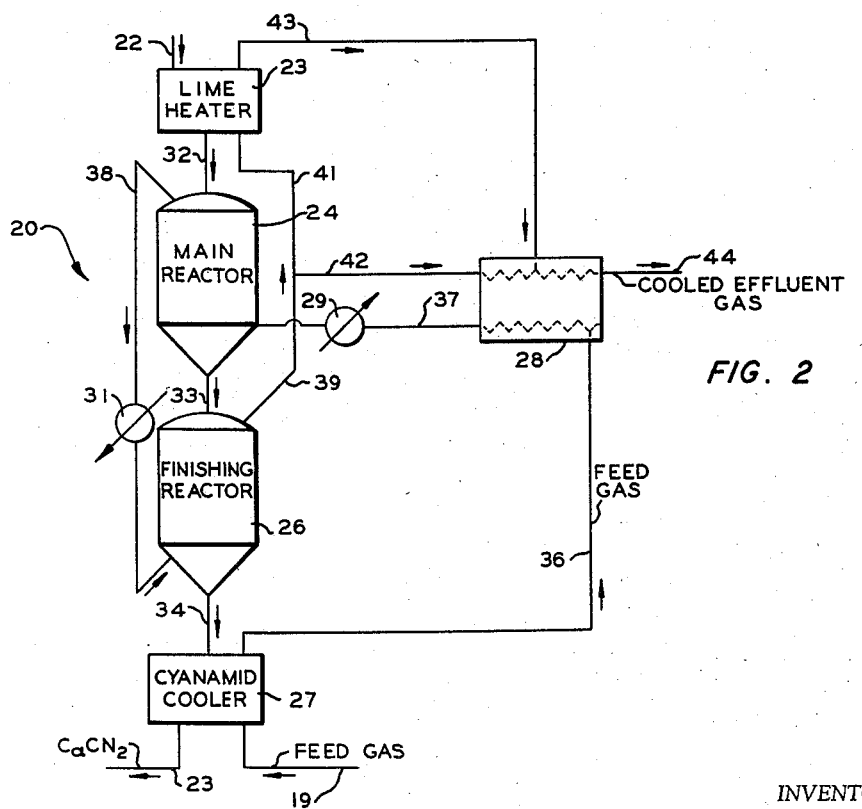
INVENTORS
K.H. HACHMUTH
A.L. DUCKWALL
BY *Hudson and Young*
ATTORNEYS Dec. 15, 1959     K. H. HACHMUTH ET AL     2,917,363
MANUFACTURE OF CALCIUM CYANAMID
Filed Dec. 31, 1956     3 Sheets-Sheet 2

INVENTORS
K.H. HACHMUTH
A.L. DUCKWALL
BY *Hudson and Young*
ATTORNEYS

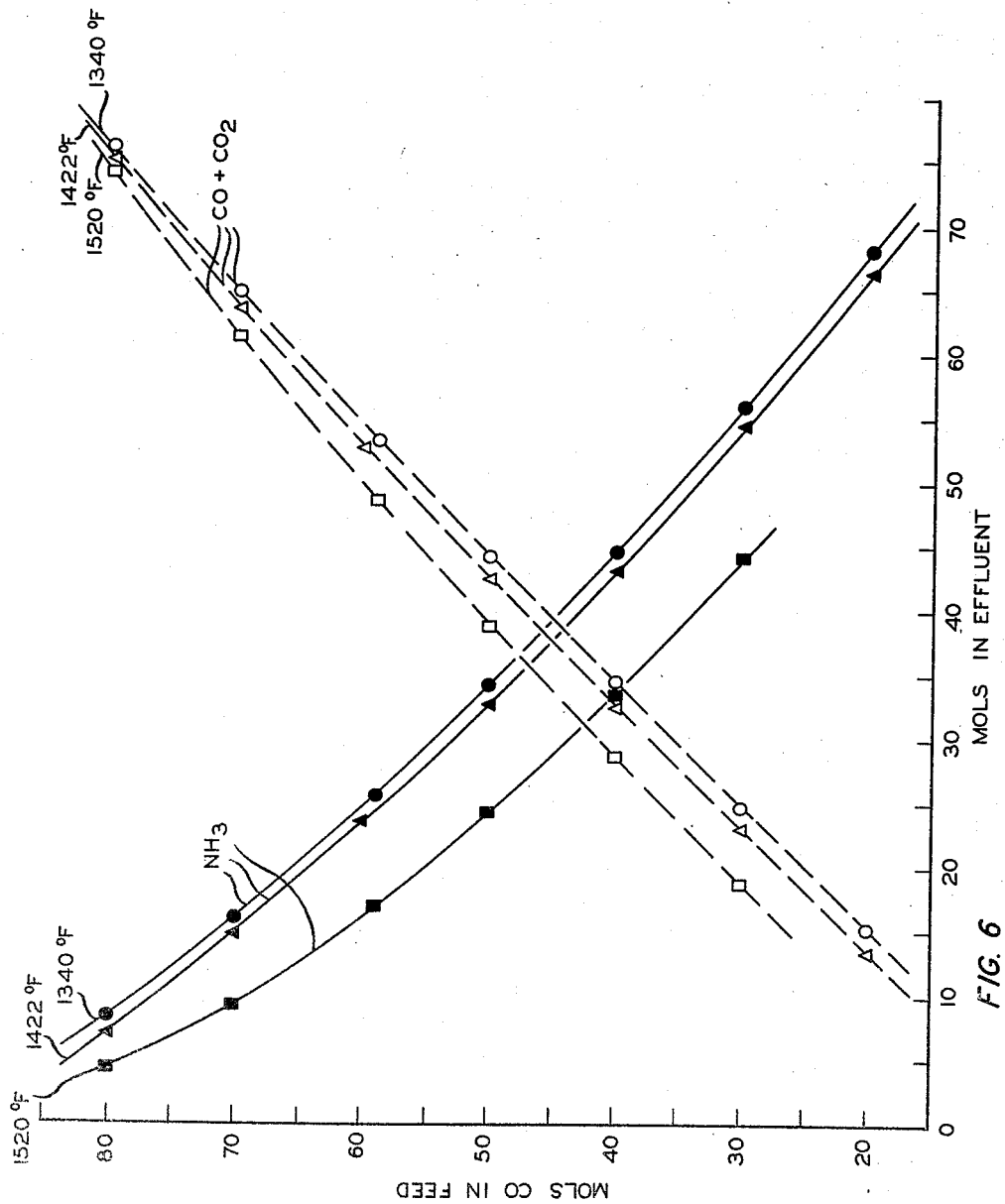

United States Patent Office 2,917,363
Patented Dec. 15, 1959

2,917,363

MANUFACTURE OF CALCIUM CYANAMID

Karl H. Hachmuth and Alvena L. Duckwall, Bartlesville, Okla., assignors to Phillips Petroleum Company, a corporation of Delaware Application December 31, 1956, Serial No. 631,699

9 Claims. (Cl. 23—78)

This invention relates to the manufacture of calcium cyanamid. In a further aspect, this invention relates to an improved process for the production of calcium cyanamid and to apparatus particularly adapted to this process.

For many years, calcium cyanamid has been produced by reacting calcium carbonate with ammonia. The reaction is carried out by introducing calcium carbonate, ammonia, and carbon monoxide into a reaction vessel and recovering calcium cyanamid as a product. The production of calcium cyanamid from the calcium carbonate and ammonia results in the production of water. The addition of carbon monoxide increases the production of calcium cyanamid because the carbon monoxide reacts with the water, thereby shifting the primary reaction equilibrium toward the production of calcium cyanamid. One difficulty with this process is that a considerable heat of reaction must be added to the reaction bed of fluidized solids at an elevated temperature. This is both difficult and expensive.

We have discovered that the reaction can be improved by the addition of calcium oxide, the amount of calcium oxide being sufficient to make the overall process adiabatic due to the reaction between the calcium oxide and carbon dioxide formed in the process. Production of the resulting calcium carbonate aids in the production of calcium cyanamid, and without the addition of the calcium oxide, the decomposition of calcium carbonate reduces the conversion to calcium cyanamid.

Furthermore, we have discovered that a comparatively narrow range of reaction temperatures should be employed. Temperatures below our preferred range result in a rapid decrease in the production of calcium cyanamid and temperatures above our preferred range cause excessive decomposition of the ammonia which, likewise, reduces calcium cyanamid production.

The following are objects of our invention.

An object of our invention is to provide an improved process for the manufacture of calcium cyanamid. A further object of our invention is to provide improved apparatus for the production of calcium cyanamid. A further object of our invention is to provide a process for the production of calcium cyanamid from calcium carbonate, calcium oxide, ammonia, and carbon monoxide, the amount of calcium oxide added being sufficient to react with carbon dioxide formed in the process and to provide thereby substantially adiabatic operation. A further object of our invention is to provide a process for the manufacture of calcium cyanamid which eliminates the difficult and expensive problem of adding the heat of reaction to a bed of fluidized solids at elevated temperatures.

Figure 3:
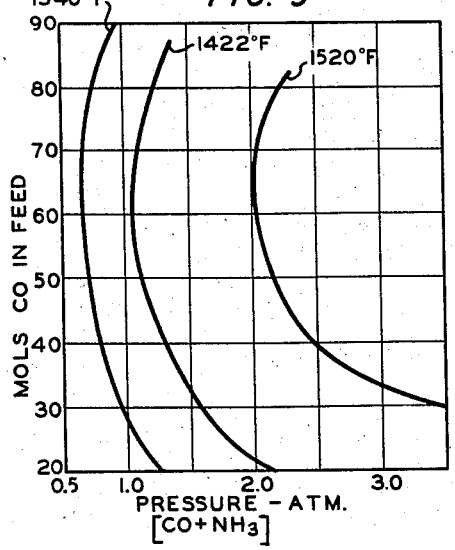

Other objects and advantages of our invention will be apparent to those skilled in the art upon reading the accompanying specification which includes a drawing comprising, Figure 1, a block diagram of our complete process for the production of calcium cyanamid, Figure 2, a schematic diagram of the reactor system for this process, Figure 3, a graph showing the pressure in atmospheres of the reactant gases with respect to mols of carbon monoxide in the feed, curves being presented from the limits of the preferred temperature range and for the temperature of optimum conversion.

Figure 5:
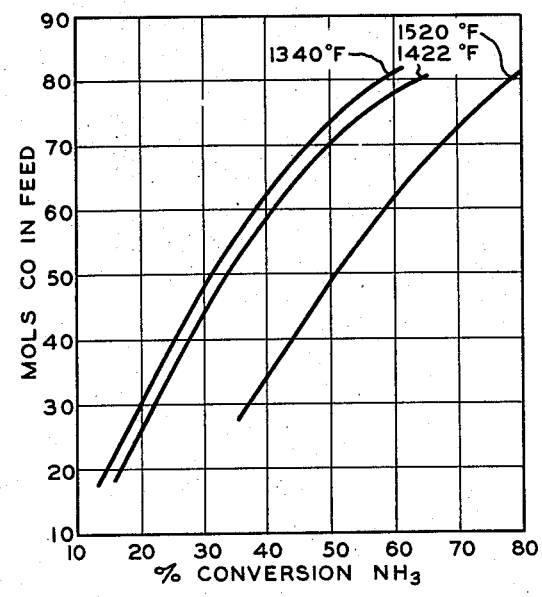

Figure 4, a graph showing the mols of ammonia converted with respect to the mols of carbon monoxide in the feed over our preferred temperature range, Figure 5, a graph showing the percentage of ammonia conversion per mol of carbon monoxide in the feed over our temperature range, Figure 6, a graph showing the mols of carbon monoxide plus carbon dioxide in the effluent and the mols of ammonia in the effluent plotted with respect to the mols of carbon monoxide in the feed over the same temperature range.

Directing attention to Figure 1, the overall process will be apparent because this figure illustrates, in block form, the various steps thereof. In this figure, gas, such as regenerator stack gas, is fed to absorber 11 by means of conduit 12. This absorber 11 is designed to remove carbon dioxide from the feed. One suitable method for this removal is to supply aqueous calcium hydroxide by means of conduit 13 to the upper portion of absorber 11. The carbon dioxide reacts with this material to produce calcium carbonate which is removed by means of conduit 14. The effluent from absorber 11 is passed by conduit 16 to a water removal zone 17 wherein the water is removed by refrigeration. Water and some ammonia is removed by conduit 18. The thus prepared gas is passed to reactor system 20 by means of conduit 19, additional ammonia being added as required through conduit 21. This additional ammonia is recovered from the process effluent gas as hereinafter described. In addition to the feed gas, a mixture of calcium oxide and calcium carbonate is supplied to reactor system 20 by means of conduit 22. Calcium cyanamid, the desired product, is recovered from the reactor system by means of conduit 23. From the reactor system, the effluent gas is treated to recover ammonia therefrom for addition to the reactor system. For this recovery, the effluent gases are passed to carbon dioxide absorber 51 by means of conduit 44. To absorb the carbon dioxide, aqueous calcium hydroxide is supplied by means of conduit 52, obviously, other separation systems could be used. Calcium carbonate is removed from absorber 51 by means of conduit 53. The effluent gas from absorber 51 is passed by conduit 54 to ammonia absorber 56 supplied with water through conduit 57 resulting in an ammonia solution being recovered through conduit 58. The residue gas containing carbon monoxide, hydrogen, and nitrogen appears as a residue gas in conduit 59.

In Figure 2, the reactor system 20 is fully set forth in a schematic diagram. The principal components of this reactor system including a lime heater 23, a main reactor 24, finishing reactor 26, a cyanamid cooler 27, a heat exchanger 28, auxiliary heater 29, and a cooler 31. An important feature of our invention involves the use of the main reactor 24 and the finishing reactor 26. This combination of two reactors in series permits operation with a much smaller total reactor volume with the same degree of completeness of reaction approached than could be obtained with a single reactor or, alternately, a much more complete reaction in the double reactor when using the same total reactor volume as in a single reactor. While we prefer the use of cooler 31 between the reactors, the process is entirely operable without it.

While we have shown lime heater 23 and cyanamid cooler 27, as single units, it is obvious that a series of heat exchangers could be used if desired, this amounting to a matter of design of these components. Two or more heat exchangers can be employed as desired. Lime heater 23, cyanamid cooler 27 and reactors 24 and 26 are preferably fluidized bed contactors although other contactors such as Herreshoff furnaces can be used. Direct or indirect heat exchange is provided in cooler 27 while the lime heater 23 and the reactors 24 and 26 should provide direct gas-solid contacting.

The various conduits for the component flow are also shown in Figure 2. As stated previously, solid material, calcium oxide and calcium carbonate, is supplied to lime heater 23 by means of conduit 22. Solid material from heater 23 passes to main reactor 24 by means of conduit 32. Solid material from reactor 24 passes to finishing reactor 26 through conduit 33 and the product, calcium cyanamid, passes from reactor 26 to cyanamid cooler 27 by means of conduit 34 from which it is recovered by means of conduit 23. The feed gas, supplied by conduit 19, passes through cyanamid cooler 27 and, by conduit 36 is passed to one side of heat exchanger 28. From this side of heat exchanger 28, the feed gas is passed to main reactor 24 by means of conduit 37 having auxiliary heater 29 therein. Gaseous reaction products from main reactor 24 are passed to finishing reactor 26 through conduit 38 having cooler 31 therein. Gases from finishing reactor 26 are removed therefrom by conduit 39, this conduit dividing to provide conduit 41 passing to lime heater 23 and conduit 42 passing the second side of heat exchanger 28. Effluent gases from lime heater 23 are removed by means of conduit 43, combined with the gases in conduit 42 in heat exchanger 28 and removed as the cooled effluent gas by means of conduit 44.

As previously pointed out, conditions have been determined wherein adiabatic operation is obtained. These conditions are graphically set forth in Figures 3, 4 and 5 using the preferred temperature range and determining the effluent composition. Figure 3 shows the partial pressure, in atmospheres, of the carbon monoxide plus ammonia needed in the feed with respect to the mols of carbon monoxide in the feed based upon a feed of 100 mols of carbon monoxide and ammonia. The system pressure for adiabatic operation can be obtained when the feed composition, including inerts such as nitrogen, and temperature are known. The reaction is substantially unaffected by changes in the total pressure on the system as long as the partial pressure of ammonia and carbon monoxide in the feed is kept constant. The effect of inerts is compensated for by using a total pressure sufficient to maintain the partial pressure of the ammonia and carbon monoxide in the feed at the proper value. Figures 4 and 5 show the mols of ammonia converted and the percent ammonia conversion on the same basis.

In the following table, various conditions are set forth wherein adiabatic operation is obtained. The material is set forth for the extremes of our preferred operating range as well as the preferred temperature of operation and varying feed stocks are presented. Furthermore, the effluent composition is set forth in Table I.

*Table 1*

| Mols CO in feed | 1,340° F. | | Partial pressure $CO+NH_3$ in the feed (atm.) | Effluent, Mols | | | | |
|---|---|---|---|---|---|---|---|---|
| | Percent $NH_3$ converted | Mols $NH_3$ converted | | $NH_3$ | CO | $CO_2$ | $H_2O$ | $H_2$ |
| 20 | 15.0 | 12.0 | 1.27 | 68.0 | 8.6 | 6.63 | 6.6 | 11.5 |
| 30 | 20.0 | 14.0 | 0.96 | 56.0 | 15.9 | 8.78 | 6.4 | 14.9 |
| 40 | 25.5 | 15.3 | 0.78 | 44.7 | 23.6 | 10.75 | 5.9 | 17.4 |
| 50 | 31.6 | 15.8 | 0.69 | 34.2 | 32.2 | 12.20 | 5.2 | 18.4 |
| 59 | 37.6 | 15.4 | 0.66 | 25.6 | 40.6 | 12.76 | 4.4 | 18.8 |
| 70 | 46.7 | 14.0 | 0.67 | 16.0 | 52.3 | 12.56 | 3.2 | 17.7 |
| 80 | 58.5 | 11.7 | 0.75 | 8.3 | 64.6 | 11.22 | 2.0 | 15.4 |
| | 1,422° F. | | | | | | | |
| 20 | 16.7 | 13.5 | 2.20 | 66.5 | 7.3 | 6.23 | 8.5 | 11.8 |
| 30 | 22.3 | 15.6 | 1.57 | 54.6 | 14.3 | 8.73 | 8.1 | 15.1 |
| 40 | 27.7 | 16.6 | 1.29 | 43.4 | 22.2 | 10.53 | 7.3 | 17.7 |
| 50 | 34.2 | 17.1 | 1.14 | 32.9 | 30.6 | 12.03 | 6.6 | 19.2 |
| 60 | 40.8 | 16.3 | 1.05 | 23.7 | 39.7 | 13.04 | 5.3 | 19.1 |
| 70 | 50.7 | 15.2 | 1.10 | 14.8 | 51.1 | 12.60 | 3.8 | 18.2 |
| 80 | 65.0 | 13.0 | 1.23 | 7.0 | 64.2 | 11.13 | 2.0 | 15.3 |
| | 1,520° F. | | | | | | | |
| 30 | 36.7 | 25.7 | 3.51 | 44.3 | 10.3 | 8.40 | 17.7 | 20.1 |
| 40 | 44.3 | 26.5 | 2.51 | 33.5 | 17.2 | 11.72 | 16.6 | 22.7 |
| 50 | 51.2 | 25.6 | 2.15 | 24.4 | 25.2 | 13.68 | 14.1 | 24.3 |
| 59 | 58.5 | 24.0 | 2.04 | 17.0 | 34.2 | 14.42 | 11.2 | 24.8 |
| 70 | 68.7 | 20.6 | 2.04 | 9.4 | 47.0 | 14.35 | 7.5 | 23.2 |
| 80 | 78.5 | 15.7 | 2.24 | 4.3 | 60.9 | 13.14 | 4.5 | 18.9 |

Figure 6 was plotted from the data of Table I in order to provide a means of obtaining the composition of the finishing reactor effluent at any given feed composition. From these curves, it is possible to determine the amount of calcium oxide and calcium carbonate necessary to feed to the system. However, it is desirable to use a slight excess of calcium carbonate in order to insure the maximum possible conversion to calcium cyanamid. An excess of 3 to 7 percent of calcium carbonate is generally used although from one to 10 percent is satisfactory.

The amount of calcium oxide added is equal to the mols of carbon in the feed minus the mols of carbon in the effluent. More specifically, the amount of calcium oxide in the feed is determined according to the following equation, all amounts being in mols $$CaO_{feed} = CO_{feed} - (CO + CO_2)_{effluent}$$

The mols of carbon monoxide in the feed are determined by analysis of the feed and the mols of carbon monoxide and carbon dioxide in the effluent are obtained from Figure 6 of the drawing.

The amount of calcium carbonate is equal to the amount of ammonia in the feed gas minus the amount of the ammonia in the effluent divided by 2 (because 2 mols of ammonia are required for each mol of calcium carbonate) minus the amount of calcium oxide in the feed. Then, taking into account the fact that an excess of calcium carbonate is desirable, the amount of calcium carbonate in the feed is determined by the following equation $$CaCO_{3feed} = \text{from } 1.01 \left( \frac{NH_{3feed} - NH_{3effluent}}{2} - CaO_{feed} \right)$$

$$\text{to } 1.10 \left( \frac{NH_{3feed} - NH_{3effluent}}{2} - CaO_{feed} \right)$$

the amount of ammonia in the feed being known, the amount of ammonia in the effluent being read from Figure 6, and the amount of calcium oxide in the feed having been previously determined.

This determination and the operation of the process can probably be best understood from a specific example wherein a feed gas is reacted with calcium oxide and calcium carbonate to produce calcium cyanamid. The amounts in this example, except where specifically otherwise recited, are all expressed in pounds. Thus, in one case the feed to reactor system 20 consists of 84,500 pounds of carbon monoxide, 22,050 pounds of ammonia, and 53,000 pounds of nitrogen. This is equivalent to 70 mols of carbon monoxide to 30 mols of ammonia. If this reaction is to be carried out at the optimum temperature, 1422° F., the composition of the effluent gas can be determined from Figure 6 and the partial pressure of ammonia plus carbon monoxide determined from Figure 3. The partial pressure of ammonia plus carbon monoxide in the feed is 1.12 atmospheres absolute while the total pressure of the system is 1.61 atmospheres. Using the equation above set forth, the amount of calcium oxide and calcium carbonate can be determined. These equations then become $$CaO = 70 - 63.7 = 6.3 \text{ mols}$$

$$CaCO_3 = \frac{30 - 14.8}{2} - 6.3 = 1.3 \text{ mols}$$

Since an excess of one to 10 percent calcium carbonate is to be used, the actual amount based on these figures would be between 1.313 mols and 1.430 mols of calcium carbonate. In this run, a 5 percent excess is used or 1.36 mols of calcium carbonate.

The calcium oxide and carbonate should be intimately and uniformly mixed and preferably be of a particle size less than 20 mesh.

A material balance for this example is set forth in Table II, the various streams being identified by the title as well as the number corresponding to the conduit as shown in Figure 2.

27 to a temperature of approximately 346° F. In heat exchanger 28, the feed gas is heated to approximately 1348° F. and subsequently heated to reaction temperature in heater 29. In this example, one-fifth of the effluent gas from finishing reactor 26 is used to heat the incoming lime from 70° F. to 1375° F., this portion of the gas being concomitantly cooled to 1181° F. This effluent from the lime heater 23 and the balance of the effluent from finishing reactor 26 are utilized in heat exchanger 28 to heat feed gas resulting in the cooled effluent gas having a temperature of approximately 396° F.

Preferably, two fluidized heat exchange beds are used to heat the lime, this providing for the reaching of equilibrium in the reacting of the calcium oxide in the feed with the carbon dioxide in the effluent gas during the time of heat exchange. Obviously, direct heat exchange is employed in the lime heater.

The process of our invention results in essentially no heat requirement for the reactor system. This is accomplished by carefully adjusting not only the ratio of calcium oxide to calcium carbonate in the solid feed but also the composition of the gaseous feed and the pressure and temperature of operation. Included in my process are means for preheating the solid feed and cooling the solid effluent with process gas. This additional heat exchange permits the overall process to operate with essentially zero heat requirement.

As many possible embodiments may be made of this invention without departing from the scope thereof, it is to be understood that all matter herein set forth or shown in the accompanying drawings is to be interpreted as illustrative and not as unduly limiting the invention.

We claim:

1. A method of producing calcium cyanamid from calcium carbonate, calcium oxide, ammonia, and carbon monoxide, comprising introducing said calcium carbonate, calcium oxide, ammonia, and carbon monoxide to a first reaction zone and reacting said compounds therein, removing solid material from said reaction zone and passing same to a second reaction zone for further reaction, removing gaseous products from said first reaction zone, and passing same to said second reaction zone for further reaction, removing solid products from said second reaction zone, and removing gaseous products from said second reaction zone, the amount of calcium oxide supplied being sufficient to react with approximately

*Table II*

|  | Feed | Finishing reactor effluent | Gas to lime heater | Solids feed | Solids to main reactor | Lime heater effluent | Total effluent | Product |
|---|---|---|---|---|---|---|---|---|
|  | 19 | 39 | 41 | 22 | 32 | 43 | 44 | 23 |
| CO | 84,500 | 62,000 | 12,400 |  |  | 12,400 | 62,000 |  |
| NH$_3$ | 22,050 | 11,100 | 2,220 |  |  | 2,220 | 11,100 |  |
| N$_2$ | 53,000 | 53,000 | 10,600 |  |  | 10,600 | 53,000 |  |
| CO$_2$ |  | 24,000 | 4,800 |  |  | 447 | 19,647 |  |
| H$_2$O |  | 3,020 | 604 |  |  | 604 | 3,020 |  |
| H$_2$ |  | 16,000 | 3,200 |  |  | 3,200 | 16,000 |  |
| CaO |  |  |  | 19,750 | 14,200 |  |  |  |
| CaCO$_3$ |  |  |  | 11,372 | 21,242 |  |  | 542 |
| CaCN$_2$ |  |  |  |  |  |  | 39,600 | 39,600 |

Since it is not desirable to have any calcium oxide in the product, we have provided the second, or finishing, reactor in series with the first. A somewhat lower temperature, up to approximately 20° F. below that of the main reactor is used, ensuring complete removal of calcium oxide by combination with the carbon dioxide. As stated, the conditions included herein gave a main reactor temperature of 1422° F. Other temperatures in the system provide for removal of calcium cyanamid at a temperature of 122° F. after contacting a feed gas at 70° F., the feed gas being heated in cyanamid cooler all carbon dioxide formed in the process and to provide substantially adiabatic operation.

2. A method of producing calcium cyanamid from calcium carbonate, calcium oxide, ammonia, and carbon monoxide, comprising introducing said calcium carbonate, calcium oxide, ammonia, and carbon monoxide to a first reaction zone, and reacting said compounds therein, removing solid material from said reaction zone and passing same to a second reaction zone for further reaction, removing gaseous products from said first reaction zone, cooling said gaseous products, and passing same to said second reaction zone for further reaction, removing solid products from said second reaction zone, and removing gaseous products from said second reaction zone, the amount of calcium oxide supplied being sufficient to react with approximately all carbon dioxide formed in the process and to provide substantially adiabatic operation.

3. A method of producing calcium cyanamid from calcium carbonate, calcium oxide, ammonia, and carbon monoxide, comprising introducing said calcium carbonate, calcium oxide, ammonia, and carbon monoxide to a first reaction zone and reacting said compounds therein, removing solid material from said reaction zone and passing same to a second reaction zone for further reaction, removing gaseous products from said first reaction zone, and passing same to said second reaction zone for further reaction, removing solid products from said second reaction zone, passing said solid products in indirect heat exchange with gaseous material fed to said first reaction zone, removing gaseous products from said second reaction zone, and passing said gaseous products in direct heat exchange with solid material supplied to said first reaction zone, the amount of calcium oxide supplied being sufficient to react with approximately all carbon dioxide formed in the process and to provide substantially adiabatic operation.

4. A method of producing calcium cyanamid from calcium carbonate, calcium oxide, ammonia, and carbon monoxide, comprising introducing said calcium carbonate, calcium oxide, ammonia, and carbon monoxide to a first reaction zone and reacting said compounds therein, removing solid material from said reaction zone and passing same to a second reaction zone for further reaction, removing gaseous products from said first reaction zone, cooling said gaseous products, and passing same to said second reaction zone for further reaction, removing solid products from said second reaction zone, passing said solid products in indirect heat exchange with gaseous material fed to said first reaction zone, removing gaseous products from said second reaction zone, and passing said gaseous products in direct heat exchange with solid material supplied to said first reaction zone, the amount of calcium oxide supplied being sufficient to react with approximately all carbon dioxide formed in the process and to provide substantially adiabatic operation.

5. A process for the production of calcium cyanamid from calcium carbonate, calcium oxide, ammonia, and carbon monoxide comprising feeding a feed gas to a reaction zone, said feed gas containing a known number of mols of ammonia and carbon monoxide, adding calcium oxide and calcium carbonate to said reaction zone and maintaining said reaction zone at a temperature in the approximate range of 1340 to 1520° F. whereby said calcium carbonate, calcium oxide, ammonia and carbon monoxide react, the amount of said calcium oxide and calcium carbonate being determined according to the following equations, all amounts being in mols, $$CaO_{feed} = CO_{feed} - (CO + CO_2)_{effluent}$$

and $$CaCO_{3feed} = \text{from } 1.01 \left( \frac{NH_{3feed} - NH_{3effluent}}{2} - CaO_{feed} \right)$$

$$\text{to } 1.10 \left( \frac{NH_{3feed} - NH_{3effluent}}{2} - CaO_{feed} \right)$$

the mols of CO and $NH_3$ in the feed being known as aforesaid and the mols of $(CO+CO_2)$ and of $NH_3$ in the effluent being read from the curves of Figure 6 of the drawing.

6. A method of producing calcium cyanamid from calcium carbonate, calcium oxide, ammonia, and carbon monoxide in a reaction system comprising a lime heating zone, a main reaction zone, a finishing reaction zone, a cyanamid cooling zone, comprising introducing calcium oxide and calcium carbonate to said lime heating zone, said calcium oxide and calcium carbonate being heated by direct heat exchange as hereinafter fully described, passing heated calcium oxide and calcium carbonate to said main reaction zone, introducing a feed gas containing carbon monoxide and ammonia heated as subsequently described into said main reaction zone, said calcium carbonate, calcium oxide, ammonia and carbon monoxide reacting in said main reaction zone, passing solids from said main reaction zone to said finishing reaction zone, removing gaseous products from said main reaction zone, cooling same, and passing same to said finishing reaction zone, said solids and gaseous products further reacting in said finishing reaction zone, removing gaseous products from said finishing reaction zone, passing a portion of said last-mentioned gaseous products to said lime heating zone to heat said calcium oxide and calcium carbonate as aforesaid, removing said gaseous products from said lime heating zone and combining same with the remaining gaseous products removed from said finishing zone, removing solid material from said finishing reaction zone and passing same to said cyanamid cooling zone, passing said feed gas in indirect heat exchange with solid material in said cyanamid cooling zone, removing cooled calcium cyanamid from said cyanamid cooling zone, removing said feed gas from said cyanamid cooling zone and passing same in indirect heat exchange with gaseous products recovered from said finishing reaction zone, supplying sufficient additional heat to bring said feed gas to reaction temperature, and introducing said heated feed gas to said main reaction zone as aforesaid.

7. A method of producing calcium cyanamid from calcium carbonate, calcium oxide, ammonia, and carbon monoxide in a reaction system comprising a lime heating zone, a main reaction zone, a finishing reaction zone, a cyanamid cooling zone, comprising introducing calcium oxide and calcium carbonate to said lime heating zone, said calcium oxide and calcium carbonate being heated by direct heat exchange as hereinafter fully described, passing heated calcium oxide and calcium carbonate to said main reaction zone, said main reaction zone being maintained at a temperature in the approximate range of 1340 to 1520° F., introducing a feed gas containing a known number of mols of carbon monoxide and ammonia heated as subsequently described into said main reaction zone, said calcium carbonate, calcium oxide, ammonia and carbon monoxide reacting in said main reaction zone, passing solids from said main reaction zone to said finishing reaction zone, removing gaseous products from said main reaction zone, cooling same, and passing same to said finishing reaction zone, said solids and gaseous products further reacting in said finishing zone, removing gaseous products from said finishing reaction zone, passing a portion of said last-mentioned gaseous products to said lime heating zone to heat said calcium oxide and calcium carbonate as aforesaid, removing said gaseous products from said lime heating zone and combining same with the remaining gaseous products removed from said finishing zone, removing solid material from said finishing reaction zone and passing same to said cyanamid cooling zone, passing said feed gas in indirect heat exchange with solid material in said cyanamid cooling zone, removing cooled calcium cyanamid from said cyanamid cooling zone, removing said feed gas from said cyanamid cooling zone and passing same in indirect heat exchange with gaseous products recovered from said finishing reaction zone, supplying sufficient additional heat to bring said feed gas to reaction temperature, and introducing said heated feed gas to said main reaction zone as aforesaid, the amount of said calcium oxide and calcium carbonate being determined according to the following equations, all amounts being in mols $$CaO_{feed} = CO_{feed} - (CO + CO_2)_{effluent}$$

and $$CaCO_{3feed} = \text{from } 1.01 \left( \frac{NH_{3feed} - NH_{3effluent}}{2} - CaO_{feed} \right)$$

$$\text{to } 1.10 \left( \frac{NH_{3feed} - NH_{3effluent}}{2} - CaO_{feed} \right)$$

the mols of CO and $NH_3$ in the feed being known as aforesaid and the mols of $(CO+CO_2)$ and of $NH_3$ in the effluent being read from the curves of Figure 6 of the drawing.

8. A method of producing calcium cyanamid from calcium carbonate, calcium oxide, ammonia, and carbon monoxide, comprising introducing said calcium carbonate, calcium oxide, ammonia, and carbon monoxide to a first reaction zone and reacting said compounds therein, removing solid material from said reaction zone and passing same to a second reaction zone for further reaction operated at a temperature below that of said first reaction zone, removing gaseous products from said first reaction zone, and passing same to said second reaction zone for further reaction, removing solid products from said second reaction zone, and removing gaseous products from said second reaction zone, the amount of calcium oxide supplied being sufficient to react with approximately all carbon dioxide formed in the process and to provide substantially adiabatic operation.

9. A method of producing calcium cyanamid from calcium carbonate, calcium oxide, ammonia, and carbon monoxide, comprising introducing said calcium carbonate, calcium oxide, ammonia, and carbon monoxide to a first reaction zone and reacting said compounds therein, removing solid material from said reaction zone and passing same to a second reaction zone for further reaction operated at a temperature below that of said first reaction zone, removing gaseous products from said first reaction zone, and passing same to said second reaction zone for further reaction, removing solid products from said second reaction zone, passing said solid products in indirect heat exchange with gaseous material fed to said first reaction zone, removing gaseous products from said second reaction zone, and passing said gaseous products in direct heat exchange with solid material supplied to said first reaction zone, the amount of calcium oxide supplied being sufficient to react with approximately all carbon dioxide formed in the process and to provide substantially adiabatic operation.

References Cited in the file of this patent

UNITED STATES PATENTS

| | | |
|---|---|---|
| 1,745,753 | Franck et al. | Feb. 4, 1930 |
| 1,948,106 | Franck | Feb. 20, 1934 |
| 2,086,171 | Neubner | July 6, 1937 |
| 2,413,469 | Schweitzer | Dec. 31, 1946 |
| 2,425,504 | Belchetz | Aug. 12, 1947 |
| 2,503,188 | Bergstrom | Apr. 4, 1950 |
| 2,503,202 | Johnson et al. | Apr. 4, 1950 |

FOREIGN PATENTS

| | | |
|---|---|---|
| 672,570 | Great Britain | May 21, 1952 |